United States Patent [19]

Helton et al.

[11] 3,939,465
[45] Feb. 17, 1976

[54] REMOTE UNDERWATER DEVICE ACTIVATING SYSTEM

[75] Inventors: Robert A. Helton; George M. Walsh, both of Middletown; Allan P. Alarie, Barrington, all of R.I.

[73] Assignee: Raytheon Company, Lexington, Mass.

[22] Filed: June 15, 1970

[21] Appl. No.: 48,891

Related U.S. Application Data

[63] Continuation of Ser. No. 824,477, May 14, 1969, abandoned.

[52] U.S. Cl. .................... 340/5 R; 325/28; 325/65; 340/16 C; 340/171 PF; 343/225
[51] Int. Cl.[2] ......................................... H04B 11/00
[58] Field of Search ......... 340/5 R, 16 C, 3 FM, 15, 340/171 A, 171 PF; 343/5 SA, 225; 325/28, 30, 33, 37, 47, 65

[56] References Cited
UNITED STATES PATENTS

| | | | |
|---|---|---|---|
| 2,513,342 | 7/1950 | Marshall | 340/16 C |
| 3,138,778 | 6/1964 | Dulin | 340/15 |
| 3,202,968 | 8/1965 | Eady, Jr. et al. | 340/6 R X |
| 3,320,576 | 5/1967 | Dixon et al. | 340/5 R |
| 3,348,226 | 10/1967 | Fischer | 340/16 C |
| 3,572,244 | 3/1971 | Garber | 340/16 C |
| 3,742,440 | 6/1973 | Ehrlich et al. | 340/5 T |

OTHER PUBLICATIONS
Snodgrass, *Science,* Vol. 162, pp. 78–87, Oct. 4, 1968.

*Primary Examiner*—Richard A. Farley
*Attorney, Agent, or Firm*—David M. Warren; Joseph D. Pannone; Milton D. Bartlett

[57] ABSTRACT

An apparatus for activating a remote underwater device comprising detecting means responsive to incident acoustic waves provides signal indication of the presence or absence of predetermined frequencies thereof. A logic arrangement decodes only those signal indications indicating a joint presence of some of the pre-selected frequencies and the absence of others of the pre-selected frequencies. This discriminates signals against broad-band acoustic noise. The logic arrangement further includes means for activating the remote underwater device only if the decoded successive signal indications match a predetermined pattern. This further discriminates between a present received acoustic wave and a prior transmitted acoustic wave present because of multipath or reverberation. Lastly, a timing and gating means responsive to a first decoded signal indication couples the detecting means to the logic arrangement only at periodic intervals thereafter. The time gating also reduces the chances of obtaining a prior multipath and reverberation signal because the pulse repetition period of the successive acoustic waves is predetermined.

5 Claims, 8 Drawing Figures

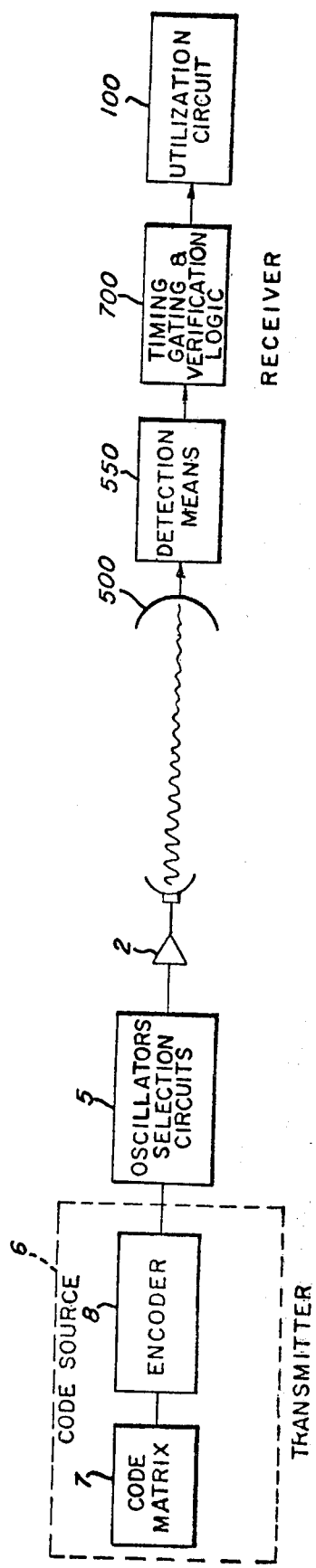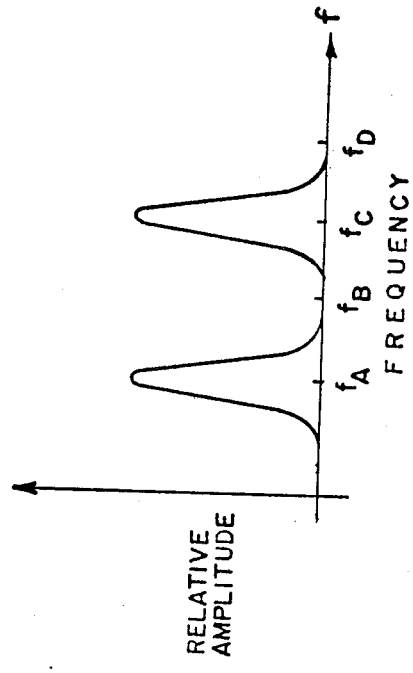
FIG. 1A
FIG. 1B
FIG. 1C
$f_A < f_B < f_C < f_D$

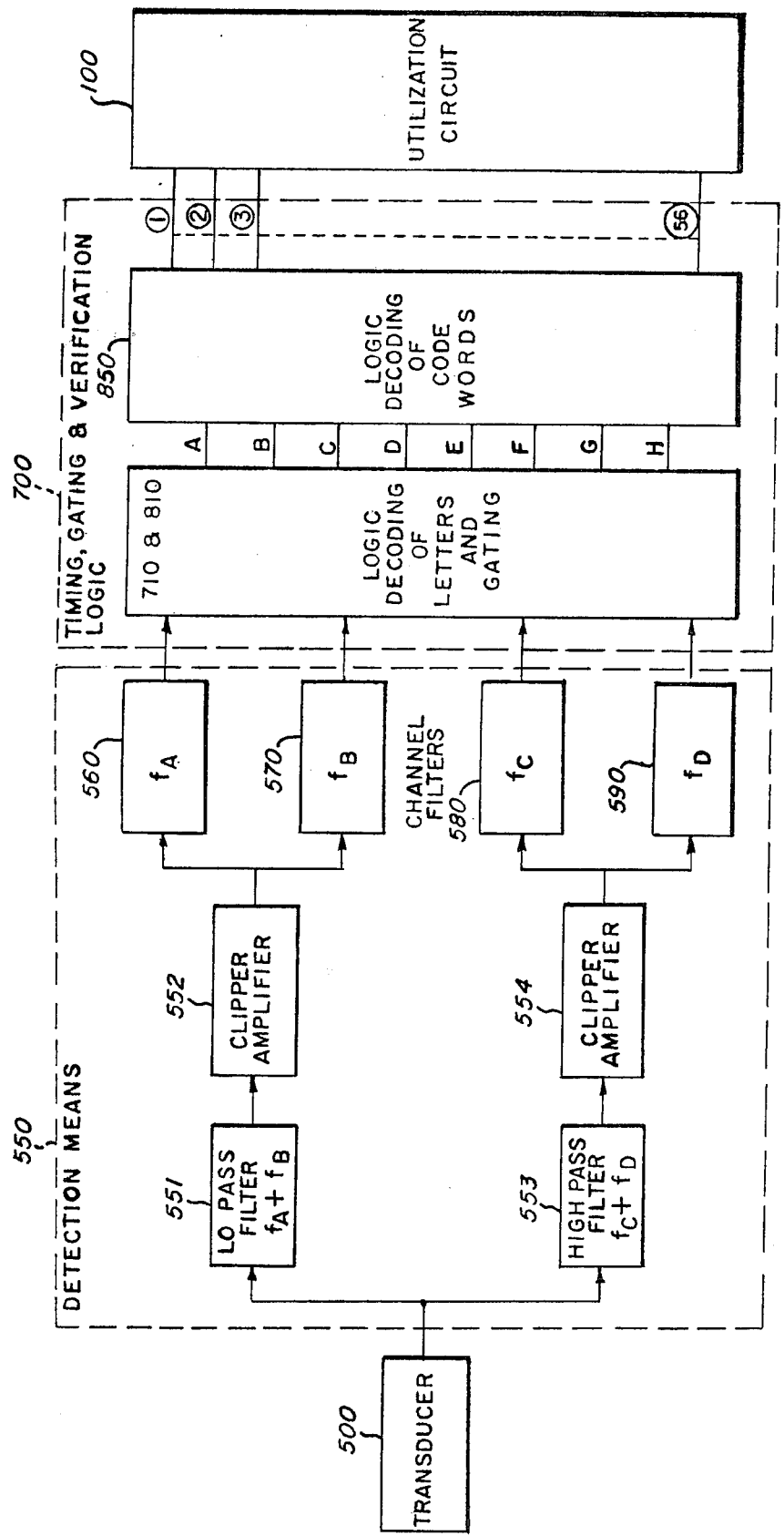

TRANSMITTER

TRANSMISSION

| | 1 | 2 | 3 | 4 | 5 | 6 |
|---|---|---|---|---|---|---|
| $F_A$ | 1 | 1 | 1 | 1 | 0 | 1 |
| $F_B$ | 0 | 0 | 0 | 0 | 1 | 0 |
| $F_C$ | 1 | 1 | 1 | 0 | 0 | 0 |
| $F_D$ | 0 | 0 | 0 | 1 | 1 | 1 |

A FREQUENCY SET $F_1, F_3$   $F_1, F_3$   $F_1, F_3$   $F_1, F_4$   $F_2, F_4$   $F_1, F_4$

TIME SEQUENCE OF TRANSMISSION

REMOTE UNDERWATER DEVICE ACTIVATING SYSTEM

This application is a continuation of application Ser. No. 824,477, filed May 14, 1969, now abandoned.

BACKGROUND OF THE INVENTION

This invention relates to an apparatus for activating a remote underwater device, and more particularly, for activating said device only upon receipt of a properly coded acoustic wave even though it is in the presence of reverberation, acoustic noise, and multipath.

The activation and control of remote underwater devices by transmitting acoustic waves from a transmitter through the water is limited by the constraints of this acoustic medium and its boundaries. Typically, an acoustic transmitter acts as a point source such that an acoustic wave spreads out ideally in a spherical pattern. Portions of the wave incident upon the air-water boundary and the water-seabed boundary are reflected back into the water medium. These reflections appear at the remote underwater device later in time than that portion of the spherical wave connected by a direct path from the underwater device to the acoustic source. Additionally, portions of the spherical wave are refracted as a function of the salinity, temperature, and depth of the water. The refracted waves also travel a longer distance than the direct path and may appear at the device before or after the direct path wave.

One prior art technique for discriminating between the direct path acoustic wave from the various other portions of the spherical wave was by lengthening the period between successive transmissions until the reflectons, refractions, and reverberations had died out. This naturally lowered the data rate to unacceptable limits.

The actual undersea environment is a mix of natural and manmade noise as well as the multipath and reverberation caused by transmitting acoustic waves therein. Consequently, successive coded acoustic signals may be embedded in acoustic noise such as that caused by ocean wave motion or rain. The signals may be subject to fading due to the refraction and propagation changes of undersea turbulence. Additionally, substitution of a present signal may be made by a prior signal time delayed by the medium. This signal substitution is sometimes termed "leak through".

Reference is made to U.S. Pat. No. 3,422,397 issued to J. A. Lagoe et al. on Jan. 14, 1969. This reference describes a remote underwater device actuated by an incident acoustic wave containing predetermined frequencies including an activating frequency. Such a device is responsive to frequency diversity transmission and space diversity reception to detect the control signals and to reduce the effects of fading. This reference further teaches that a Hamming type digital error detecting code can be used to at least partially protect transmissions from error.

Hamming codes when used in this environment require substantial and complex terminal equipment at both the transmitter and receiver. In this regard, reference may be made to "Logical Design of Digital Computers" by Montgomery Phister, Jr., published by John Wiley & Sons, Feb. 1959, at pages 329 through 336. Additionally, the system of the Lagoe et al. patent appears susceptible to "leak through" and otherwise insensitive to a substitution of one frequency by another with the consequent error effects at the receiver. Lastly, the system of this reference may be falsely actuated by broad-band noise or by intentional frequency sweeping at least on the character if not the word basis.

It is, accordingly, an object of this invention to devise a remote underwater device activating system responsive only to error free received signals and having a substantial capability of discriminating each received acoustic wave from noise, multipath, and reverberation. Relatedly, the activating system should discriminate also between successive groups of received signals and predetermined patterns.

It is, accordingly, another object of this invention to utilize the exclusive frequency diversity form of underwater acoustic signal reception to uniquely distinguish a coded acoustic wave from broad-band noise.

It is a related object of this invention to devise a remote underwater device activating system, which activating system may detect acoustic waves at some distance from the device communicating therewith by some fixed wire means.

Lastly, it is yet another object of this invention to devise an activating system responsive only to successive acoustic waves coded so as to minimize the effects of frequency changes in the encoded signals due to some form of intersymbol influence such as crossmodulation.

SUMMARY OF THE INVENTION

The aforementioned objects of the invention are satisfied in an embodiment used in combination with a remote underwater device, which embodiment comprises detecting means responsive to each incident acoustic wave, a logic arrangement for decoding successive acoustic waves and activating the remote underwater device, and a timing and gating means for coupling the detector to the logic arrangement at predetermined times. The invention may be housed separately from the remote underwater device and connected thereto by an appropriate coupling means such as fixed wire.

The detecting means provides signal indication of the presence or absence of predetermined frequencies in each incident acoustic wave. The logic arrangement decodes only those signal indications showing a joint presence of specific pre-selected frequencies and the absence of other specific pre-selected frequencies. The logic arrangement further includes means responsive to successive decoded signal indications for activating the underwater device only if the decoded successive signal indications match a predetermined pattern. Finally, the timing and gating means are made responsive to a first decoded signal indication and essentially connect the detecting means to the logic arrangement only at periodic intervals thereafter. In this regard, the underwater device is sensitive to transmissions of a predetermined pulse repetition frequency.

This device utilizes the "exclusive frequency diversity" technique described in co-pending U.S. patent application Ser. No. 679,785, filed Nov. 1, 1967, now abandoned, by Stanley L. Ehrlich et al., entitled "A System for Activating a Remote Underwater Device". This technique consists of activating a remote underwater device by transmitting certain pre-selected frequencies. The remote underwater device becomes activated by detecting the joint presence of the transmitted frequencies and the specific absence of other frequencies. Most systems require only the joint presence of pre-selected frequencies and thus do not discriminate against broad-band noise.

In the instant invention a unique code may be built up from the presence or absence of a predetermined number of different frequencies and transmitted to the remote underwater device. The logic arrangement is made responsive only to pairs of successive transmissions, each of which designates a unique one out of $r$ possible code elements. Now, $q$ such code elements form a word where $q<r$. There are, however, only $r(r-1)(r-2) \ldots (r-q+1)/q!$ different *non-ordered* words usable to activate the remote device. This prevents the substitution of one code letter for another which although valid on an individual letter basis would be out of place when looking at a sequence.

Another significant aspect of the invention derives from "time gating". This includes connecting the detector to the logic arrangement at periodic intervals corresponding to the known pulse repetition period after a first transmission. A momentary signal outage caused by multipath interference will not cause an error if both frequencies of a transmission are, for example, simultaneously present at any time during the time interval the detector is connected to the logic arrangement.

Another aspect of the invention arises from the use of clipper type amplifiers to provide independence from absolute received signal intensity levels. This provides constant input level to the logic arrangement.

These and other features and aspects of the invention are described in further detail and are apparent when taken together with the drawings.

BRIEF DESCRIPTION OF THE DRAWINGS

FIG. 1A is a block diagram representation of an acoustic transmitter and acoustic receiver located at the remote underwater device.

FIG. 1B is a typical logic representation of combinations of the presence and absence of pre-selected frequencies as viewed by the detecting means in combination with the remote underwater device.

FIG. 1C shows a relative amplitude versus frequency curve exhibiting presence and absence of signal frequencies.

FIG. 2 exhibits a general logic level block diagram of the activating system in combination with the underwater device.

DESCRIPTION OF PREFERRED EMBODIMENT

Figure 3A:
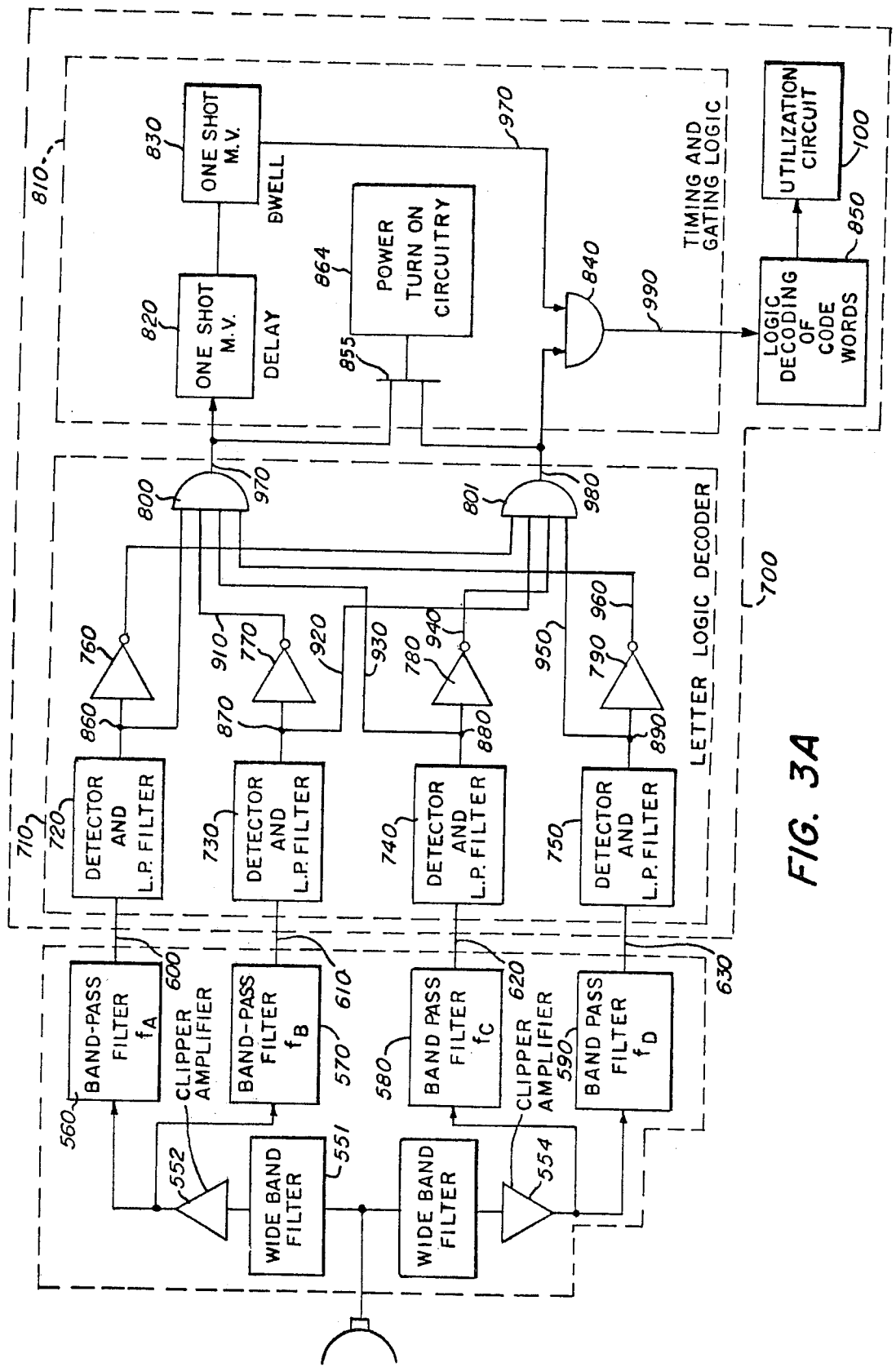
FIG. 3A is a detailed logic level block diagram of the activating device as shown in FIG. 2.

Referring now to FIG. 1A of the drawings, there is shown an acoustic transmitter on the left and a receiver remote from the transmitter on the right. The transmitter produces a frequency coded acoustic wave. The frequency encoding consists of simultaneously transmitting two out of four different frequencies. The specification of what frequencies are to be transmitted or omitted is obtained from code source 6. The code source forms a selection as a binary number representation of "ones" and "zeros". This in turn is sent to the selection circuits 5. Selection circuits and oscillators 5 are responsive to the binary code and generate the specific frequencies. These frequencies are applied simultaneously to amplifier 2. The amplifier drives corresponding transmitting transducer 1.

If the acoustic wave is incident upon receiving transducer 500, then the converted electrical signal is applied to detecting means 550. Timing, gating and verification logic arrangement 700 will decode the output from the detection means 550 and will apply an output from the detection means 550 and will apply an activating signal to utilization circuit 100 if a predetermined number of successively decoded signals match a predetermined pattern stored in the logic.

Referring now to FIG. 1C, there is shown a transmission spectrum of relative amplitude versus frequency of the system shown in FIG. 1A. For purposes of illustration and description of the preferred embodiment, four frequencies will be used. The preferred embodiment utilizes a two out of four frequency code. That is, only two out of four frequencies are transmitted. The receiver will, depending upon the frequencies received, look for the absence of certain other frequencies. The notches in the transmission spectrum shown in FIG. 1C are represented by frequencies $f_B$ and $f_C$. The transmission frequencies are illustratively represented as $f_A$ and $f_D$. The frequencies are spaced from $f_A$, being the lowest frequency, through $f_D$, being the highest frequency.

The transducers 1 and 500 shown in FIG. 1A preferably comprise pressure proof lead zirconate titanate spheres tested to 2,000 pounds per square inch. The pass bands may in one embodiment be between 24 kilohertz to 46 kilohertz with a transmitting source level of +87db/microbar and a receiving sensitivity of −90db/1 volt/microbar.

Referring now to FIG. 2 of the drawing, there is shown a general logic level block diagram of the activating system in combination with the underwater device emphasizing the receiving system. As pointed out in the description of FIG. 1A, waves generated by transducer 1 impinge upon transducer 500 by a number of different paths. There is the direct path, refracted paths and reflected paths. As previously mentioned, noise and reverberating signals may be impressed upon or replace one or more successive transmissions.

Detection means 550 comprise a high-pass and low-pass band width channel filters 553 and 551. These are driven in parallel by the signal output of transducer 500. Clipper amplifiers 552 and 554 respectively normalize the varying signal amplitudes derived from the corresponding low-pass and high-pass channel filter outputs. The band widths of the channels are arranged such that the low-pass band width may be from about 24 kilohertz to about 35 kilohertz. Likewise, the high-pass band may be from about 36 kilohertz to about 46 kilohertz. In the four-frequency code described with regard to the preferred embodiment, two of the four frequencies, $f_A$ and $f_B$, lie in the low-pass band while the other two of the four frequencies, $f_C$ and $f_D$, lie in the highpass band. Also the frequencies are related such that $f_A<f_B<f_C<f_D$. The output of clipper amplifiers 552 and 554 comprises constant energy signals. As is well known, the output signal amplitude from such a clipper amplifier is a function of the ratio of the band widths of the two filters and of the signal to noise ratio. It is, however, independent of absolute level.

The detection means further comprises a first plurality of narrow band filters 560 and 570 driven by clipper amplifier output 552 tuned to corresponding ones of the pre-selected frequencies $f_A$ and $f_B$. A second plurality of narrow band filters 580 and 590 driven by clipper amplifier output 554 are tuned to the corresponding frequencies $f_C$ and $f_D$. The signal outputs of these filters represent the presence or absence of the frequencies in an incident acoustic wave.

Detection means 550 drives timing, gating and verification logic 700. Logic 700 comprises an arrangement shown in greater detail in FIG. 3A for the logic decoding of letters and gating. It is driven by the output of filters 560, 570, 580, and 590.

Signals or successive groups of signals represent letters of an alphabetic code; the details of this code will hereinafter be described with reference to FIG. 4. The decoded letters are applied to an arrangement 850 for logically decoding letter sequences called code words. If the decoded sequences match predetermined patterns, then any one of the output signal lines (1) through (56) can be activated, thereby energizing some portion of utilization circuit 100.

Figure 3B:
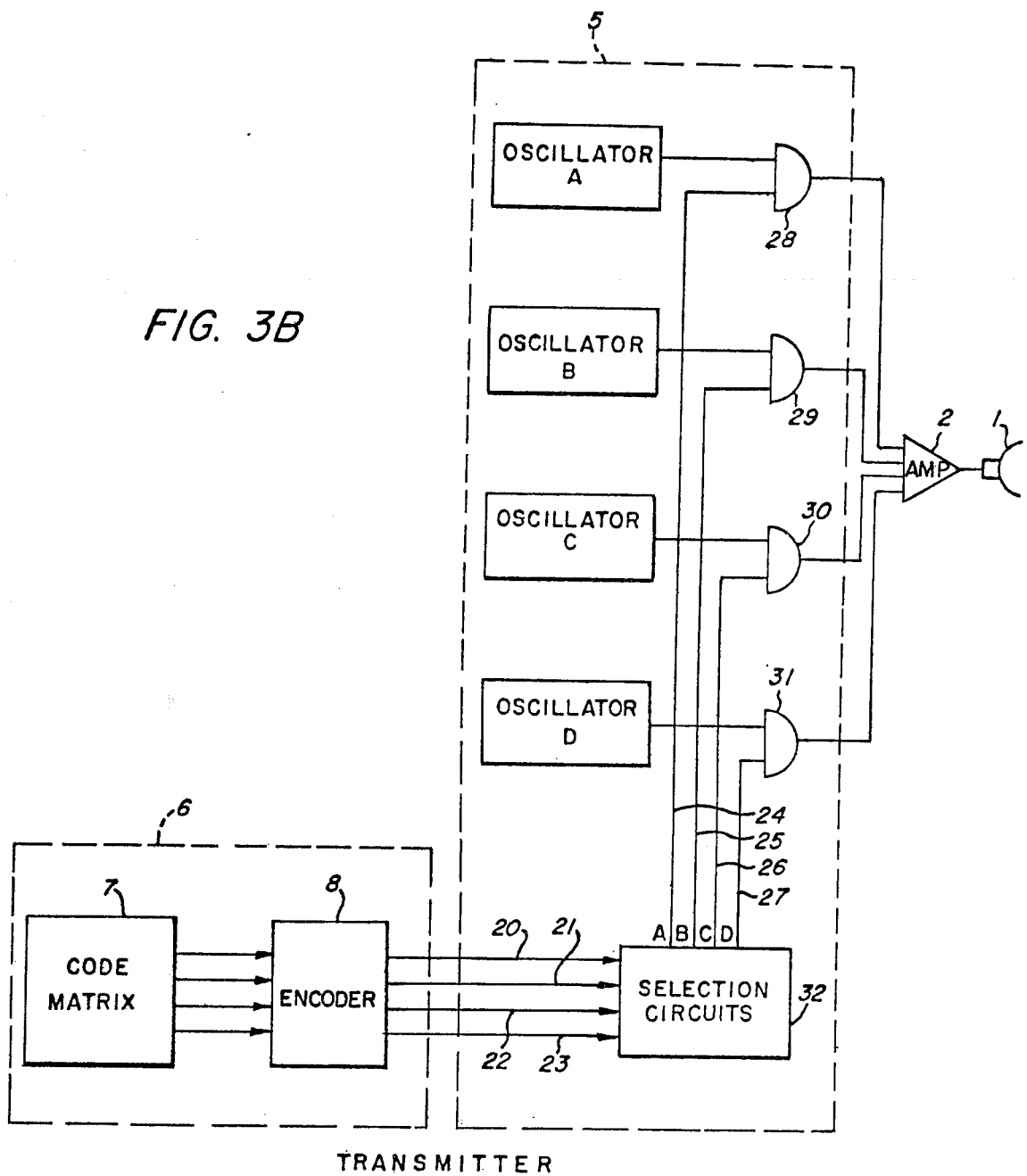
FIG. 3B is a block diagram representation of the transmitter shown in FIG. 1A

Referring now to FIG. 3B, there is shown a detailed view of the transmitter. Code source 6 may comprise code matrix 7 driving an encoder 8. The code matrix may consist of any one of a number of well-known memory media, such as magnetic cores, ferrites, or magnetic tape with suitable reading electronics. In the preferred embodiment, the code matrix is a simple electronic readout from a conventional bistable multivibrator driving the encoder and comprising suitable and well-known pulse shaping and timing circuitry. If the code matrix or other memory medium is serial, then the encoder must necessarily convert the information in an appropriate register so that the information may be applied in parallel on corresponding lines 20, 21, 22, and 23.

The selection circuits and oscillators 5 comprise illustratively four oscillators A, B, C, and D, having four different resonance frequencies of which $f_A$ is the lowest and $f_D$ is the highest. The oscillators should preferably be of the crystal frequency controlled type with their operating resonance frequency in the range between 24 to 46 kilohertz for one embodiment.

AND gates 28, 29, 30, and 31 terminate the respective corresponding oscillators A, B, C, and D. Amplifier 2 terminates AND gates 28 and 29. Similarly, amplifier 4 terminates AND gates 30 and 31. Selection circuits 32 turn the AND gate on and off by application of a suitable binary signal. Thus, a voltage impressed respectively on lines 24, 25, 26, or 27 would gate through a signal at the respective frequencies from oscillators A, B, C, or D through to the corresponding AND gates 28, 29, 30, or 31.

When an appropriately coded binary signal from code source 6, such as 1010, is applied in parallel to lines 20, 21, 22, and 23, the selection circuits 32 will apply a voltage on lines 24 and 26. This in turn will actuate AND gates 28 and 30. Consequently, a frequency $f_A$ and $f_C$ will be applied to respective amplifiers 2 and 4. Similarly, 0101 would cause frequencies $f_B$ and $f_D$ to be applied through respectively AND gates 29 and 31 to amplifiers 2 and 4.

The system of activating a remote underwater device only upon the detection of the joint presence of some frequencies and the absence of other frequencies is termed "exclusive frequency diversity" coding. Reference may be made to co-pending U.S. patent application Ser. No. 679,785 filed on Nov. 1, 1967, now abandoned, in the name of Stanley L. Ehrlich et al.

Each transmission from the transmitter may comprise a long pulse in the order of 120 milliseconds consisting of two of the four frequencies. The receiver must detect the presence of the two transmitted frequencies and simultaneously the absence of the two other frequencies in order to accept a transmission. Each code letter used in the system consists of *two* transmissions. In order to increase security, the detecting means is only responsible to a first transmission in which there is an absence of a frequency between the two transmitting frequencies. Illustratively, if $f_A$ and $f_C$ are two detected present frequencies, then $f_B$ must not be present where $f_A < f_B < f_C < f_D$.

The following Table 1 is a typical set of letter codes. Each code letter is formed from two transmissions labelled respectively first and second transmission. A "1" designates the presence of a frequency while "0" denotes its absence.

TABLE 1

| No. | Letter | First Transmission | | | | Second Transmission | | | |
|---|---|---|---|---|---|---|---|---|---|
| | | $f_A$ | $f_B$ | $f_C$ | $f_D$ | $f_A$ | $f_B$ | $f_C$ | $f_D$ |
| 1. | A | 1 | 0 | 1 | 0 | 1 | 0 | 1 | 0 |
| 2. | B | 1 | 0 | 1 | 0 | 0 | 1 | 0 | 1 |
| 3. | C | 1 | 0 | 1 | 0 | 1 | 0 | 0 | 1 |
| 4. | D | 1 | 0 | 1 | 0 | 0 | 1 | 1 | 0 |
| 5. | E | 0 | 1 | 0 | 1 | 1 | 0 | 1 | 0 |
| 6. | F | 0 | 1 | 0 | 1 | 0 | 1 | 0 | 1 |
| 7. | G | 0 | 1 | 0 | 1 | 1 | 0 | 0 | 1 |
| 8. | H | 0 | 1 | 0 | 1 | 0 | 1 | 1 | 0 |

Three different eight-letter sets may be used. The eight sets of frequencies are available and provide a total of 24 sets of eight letters each. These sets are mutually non-interfering in the sense that any single error either of frequency dropout or of interfering reverberation will not produce an error command.

A *code word* can consist of *three code letters*. The letter combinations for the code words are chosen non-ordered. This means that no individual letter may be used more than once in a code word. Furthermore, no set of three letters may be used in another code by rearrangement. The total number of commands available from one eight-letter set is then:

$$N = 8!/3!5! = 56$$

Figures 4A, 4B:
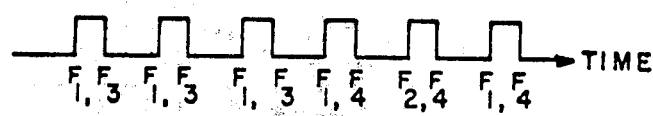
FIG. 4A is a typical transmission frequency set.
FIG. 4B is a time sequence of transmission.

Referring now to FIG. 4B of the drawing, there is shown a single code word. It consists of six consecutive transmissions in which each transmission consists of two frequencies. Each two-frequency transmission has a pulse length of 120 milliseconds and an interpulse interval of 380 milliseconds for minimizing intersymbol interference due to multipath and reverberation.

Let us digress for a moment to consider the data rate so as to appreciate the quantitative aspects of the system. It has been found that a typical total transmission time for a command is 2.62 seconds. Assuming that there are 56 equally probable commands, then the information content per command is $\log_2 1/P$ bits $= \log_2 1/1/56 = \log_2 56 = 5.807$ bits per command. This results in a data rate of 2.2 bits per second for one embodiment.

It is necessary to choose frequencies that ensure a dead band or a zero frequency spectrum hole between two adjacent frequencies. This provides immunity from false triggering due to broad-band noise sources. The frequencies are chosen in the order of lowest to highest, i.e., $f_A, f_B, f_C$, and $f_D$. Accordingly, there are three very secure code frequency combinations as set forth in Table 2. In this table, "1" is the presence of the frequency and "0" is the absence of the frequency.

TABLE 2

| Secure Frequency Combination | $f_A$ | $f_B$ | $f_C$ | $f_D$ |
| --- | --- | --- | --- | --- |
| I | 0 | 1 | 0 | 1 |
| II | 1 | 0 | 1 | 0 |
| III | 1 | 0 | 0 | 1 |

As previously mentioned, each code word consists of six consecutive transmissions. The six transmissions are ordered in the following manner. The first, third, and fifth transmissions always consist of one of the three secure frequency combinations set forth in Table 2. The second, fourth, and sixth transmissions are chosen so as to provide four additional code choices. The result is that, of the six transmissions, taken two at a time, the first two transmissions give a choice of one of eight possible letters. The second group of two transmissions represents another letter out of the set of eight that are available. Lastly, the third set of two transmissions represents the third letter out of a set of eight. No letter is repeated within any one code word. Thus, there are eight possible ways to select the first transmission, seven possible ways to choose the second transmission, and six possible ways to choose the third transmission. A further feature is that the code sets are chosen to be nonordered. This reduces the number of allowable codes by 1/3!. In other words, referring to Table 1 the code CAB would be the same as the code letters ABC. This in turn would be the same as the code letters BAC. Thus, the number of possible sets is 8×7×6/3! = 56. This is the combinatorial rather than the permutative grouping.

Of course, additional codes can be formed by changing the initial four-frequency code set. There is a limitation in that the proper operation of the remote unit requires that the frequency band of interest be divided into two sections such that in any two-frequency transmission, one frequency lies in the lower half of the band and the other frequency lies in the upper half. This prevents mutual interference of the two frequencies in the clipper amplifiers described with reference to FIG. 2.

Summarizing then with respect to the transmission codes and with reference to Tables 1 and 2 and FIGS. 4A and 4B, there is an initial choice of four frequencies out of a group of 16 possible frequency combinations. A code word is seen to consist of six successive transmissions in which each transmission consists of two out of four frequencies. Eight non-interfering four-frequency sets can be generated from these 16 frequencies. Thus, eight remote underwater units can simultaneously operate in the same field, each having 56 channels with no mutual interference.

Referring now to FIG. 3A of the drawing, there is shown a detailed block diagram of the detector 550 and the logic decoding arrangement 710 and 810 of the apparatus shown in FIG. 2. The output of detector 550 appears on conductors 600, 610, 620, and 630 and is correspondingly applied to corresponding detectors 720, 730, 740, and 750. An output upon any of the respective lines having an amplitude exceeding a predetermined minimum is rectified and filtered and applied as a DC level or pulse to the corresponding inverters 760, 770, 780, and 790 at their corresponding input nodes 860, 870, 880, and 890. Two AND gates 800 and 801 terminate the inverters.

Illustratively, AND gate 800 in combination with inverters 760, 770, 780, and 790 is wired to pass a 1010 input. This corresponds at detector 720, 730, 740, and 750 to the simultaneous presence of frequencies $f_A$ and $f_C$ and the absence of frequencies $f_B$ and $f_D$. Similarly, AND gate 801 in combination with the inhibit gates is wired to pass the input 0101. This represents the simultaneous absence of frequencies $f_A$ and $f_C$ and the presence of frequencies $f_B$ and $f_D$. Two additional gates (not shown in FIG. 3A) may be coupled to the invertors 760, 770, 780 and 790, and to the input nodes 860, 870, 880, and 890 in a manner analagous to the coupling of the AND gates 800 and 801 to detect the 1001 and the 0110 signal shown herein above at line 3 and 4 of Table 1. The timing and gating logic as shown in block 810 comprises AND gate 840 being driven by the conjunctive input of AND gates 800 and 801. This arrangement further includes two one-shot multi-vibrators 820 and 830 in series connection therewith.

ADDITIONAL ASPECTS OF THE SYSTEM

The remote underwater unit and the activating apparatus should preferably be maintained in standby status so as to minimize power drain. That is, the system will be turned on only in response to a first transmission. After reception of the first transmission the power is turned on through OR gate 855 and power turn on circuitry 864, and the logic circuits are inhibited until the time of arrival of the next pulse. This may be accomplished illustratively as follows. At the time of the next pulse, a gate (not shown) is opened for a short period of time and this gate is chosen to lie completely within the pulse length. During this gate period the thresholds are interrogated. If the signal should exceed the threshold at any time during the gate, a bistable circuit will be set. Thus, should the signal fade out during the time of this gate, this will no longer affect the condition of such circuit. Relatedly, any threshold crossing during the gate period will set the bistable.

On detection of a second transmission of a code word, another delay gate is set to inhibit the inputs to the first gate. The result is that each transmission initiates a gating circuit for the following transmission. Thus, the logic arrangement is only opened to receive a signal from the detection means at the time at which we expect the transmission to be present. This serves to lock out the multipath interference and minimize susceptibility to transient noise pulses. An alternative embodiment could make use of an accurately timed clock to control the gating interval after reception of the first signal.

A decoding matrix takes each pair of transmissions which have been decoded and passed into logic decoding arrangement 850 and combine these into a three-letter code word. A test is then performed to match the code word against one of the permissible 56 possible commands and secondly to lock out non-complete codes or false codes.

CONCLUSION

A system for activating a remote apparatus has been described which prevents false actuation due to broadband noise, and is secure against the effects of multipath and reverberation. The ability to overcome multipath and reverberation is achieved through the use of time gating, exclusive frequency diversity coding, a dual channel clipper receiver, and the use of an encoding pattern in which the code elements are mutually non-interfering.

We claim:

1. Apparatus for activating a submerged device, the apparatus comprising:
   detecting means responsive to incident acoustic waves which communicate a succession of signal pulses for detecting said signal pulses to provide signal indications of the presence or absence of predetermined frequencies therein;
   a logic arrangement coupled to said detecting means for the coding only those signal indications manifesting a joint presence of certain preselected frequencies and the absence of other preselected frequencies, said logic arrangement further including means responsive to successive decoded signal indications, said logic arrangement including a delay means and a gate responsive to said delay means to permit activation of said submerged device only if a second one of said signal indications occurs a predetermined time after the occurence of a first one of said signal indications; and
   said detecting means further comprising a first wide-band filter for passing a first of said present preselected frequencies and a second wide band filter for passing a second of said present preselected frequencies, and a first and a second limiting means coupled respectively to said first wide-band filter and said second wide-band filter, the output of said first limiting means being coupled to a pair of bandpass filters tuned to a pair of said preselected frequencies, said second limiting means being coupled to a second pair of band-pass filters tuned to a second pair of frequencies of said preselected frequencies.

2. Apparatus for activating a submerged device, the apparatus comprising:
   detecting means responsive to incident acoustic waves for detecting successive pulse signals communicated by said waves, said detecting means including:
   a low pass and a high pass band width channel, and limiting means within each channel for normalizing various varying input signal levels so as to provide a constant output level signal;
   a first plurality of narrow band-pass filters responsive to the low-pass band normalizing means output signal for providing signal indication of the presence of corresponding preselected frequencies such as $f_A$ and $f_B$;
   a second plurality of narrow band-pass filters responsive to the high-pass band normalizing means output signal for providing signal indication of the presence of other preselected frequencies such as $f_C$ and $f_D$, where $f_A < f_B < f_C < f_D$;
   a logic arrangement for detecting only those signal indications manifesting the joint presence of preselected ones of the frequencies such as $f_A$ and $f_D$ and the absence of other preselected frequencies such as $f_B$ and $f_C$, said logic arrangement further including means responsive to successive decoded signals for activating the submerged device only if the decoded successive signals match a predetermined pattern, said activating means including delay means and gating means responsive to a first of said signal indications for gating a second of said signal indications only if said second signal indication occurs at a predetermined time after the occurence of said first signal indication.

3. A system for activating a remote underwater device comprising:
   a transmitter for generating acoustic waves which communicate a succession of signal pulses, said waves having predetermined frequencies therein;
   detecting means responsive to incident ones of said generated acoustic waves for detecting said signal pulses to provide signal indications of the presence or absence of predetermined frequencies therein;
   a logic arrangement for decoding only those signal indications manifesting a joint presence of m out of n preselected frequencies and the absence of n—m other preselected frequencies, said logic arrangement further including delay means and gating means responsive to a first of said signal indications for gating a second of said signal indications only if said second signal indication occurs a predetermined time after said first signal indication for activating said remote underwater device; and
   said detecting means comprising a first and a second band pass filter for passing respectively a first portion and a second portion of said predetermined spectrum, a first and a second limiting means coupled to output terminals of respectively said first and said second band pass filters, one of said present frequencies passing through said first band pass filter and a second of said present frequencies passing through said second band pass filter.

4. In combination:
   means for generating a sequence of signal pulses, having a predetermined spectrum in which certain predetermined frequencies are present and in which other predetermined frequencies are absent;
   means responsive to said sequence of signal pulses for detecting the presence and absence of said predetermined frequencies of said spectrum and providing a first signal indicating such presence and such absence of said frequencies;
   means responsive to said first signal of said detecting means for providing a second signal at a predetermined time subsequent to said first signal;
   means responsive to the temporal concurrence of said second signal with said first signal in response to a subsequent one of said sequence of said signal pulses, for providing a signal indicating the simultaneous presence of said second signal and said subsequent first signal of said detecting means; and
   said detecting means comprising a first and a second band-pass filter for passing respectively a first portion and a second portion of said predetermined spectrum, a first and a second limiting means coupled to output terminals of respectively said first and said second band-pass filters, one of said present frequencies passing through said first band-pass filter and a second of said present frequencies passing through said second band-pass filter.

5. A secure communication system comprising:
   means for radiating pulse train signals into a medium, said pulse train signals having a predetermined frequency spectrum in which a plurality of predetermined frequencies are present and which a plurality of predetermined frequencies are absent;
   means spaced from said radiating means in said medium for receiving said pulse train signals;
   means fed by said receiving means and responsive to said pulse train signals for decoding said pulse train signals, said decoding means having logic means responsive to the relative spectral positions of said present frequencies and said absent frequencies in said spectrum for providing a signal, if, and only if, there is an absence of each of said absent frequencies and if, and only if, there is a presence of each of said present frequencies; and said receiving means comprises a first and a second band-pass filter for passing the frequencies respectively in a first portion and in a second portion of said spectrum, and a first and a second limiting means coupled respectively to first and said second band-pass filters, the output of said limiting means being coupled to filters tuned to individual ones of the frequencies of said spectrum.

* * * * *